United States Patent
Brauch et al.

[19]

[11] Patent Number: 5,914,049
[45] Date of Patent: Jun. 22, 1999

[54] METHOD AND APPARATUS FOR HELICAL FLOW IN A HEADER CONDUIT

[75] Inventors: Joseph Karl Brauch, Aurora; Ronald Eddie Dollar, Arvada; Jerry Boyd Francis, Aurora; Christopher Dale Hanson, Arvada; Charles Lonnie Meurer, Golden, all of Colo.

[73] Assignee: Meurer Research, Inc., Golden, Colo.

[21] Appl. No.: 08/724,271

[22] Filed: Sep. 19, 1996

[51] Int. Cl.⁶ .................................................. B01D 21/02
[52] U.S. Cl. ........................ 210/803; 210/787; 210/788; 210/525; 210/527; 15/246.5
[58] Field of Search .................... 210/527, 525, 210/512.1, 767, 787, 788, 803; 15/246.5

[56] References Cited

U.S. PATENT DOCUMENTS

| | | | |
|---|---|---|---|
| 2,646,889 | 7/1953 | Dulak | 210/207 |
| 2,980,934 | 4/1961 | Steindorf | 15/1.7 |
| 3,228,524 | 1/1966 | Richards | 210/138 |
| 3,416,176 | 12/1968 | Ravitts | 15/1.7 |
| 3,959,838 | 6/1976 | Hannah | 15/1.7 |
| 4,023,227 | 5/1977 | Chauvier | 15/1.7 |
| 4,065,391 | 12/1977 | Farabaugh | 210/274 |
| 4,099,966 | 7/1978 | Clendenen | 210/413 |
| 4,144,174 | 3/1979 | Graham et al. | 210/527 |
| 4,193,871 | 3/1980 | White et al. | 210/142 |
| 4,276,165 | 6/1981 | Chamberlain | 210/527 |
| 4,383,922 | 5/1983 | Beard et al. | 210/521 |
| 4,401,576 | 8/1983 | Meurer | 210/803 |
| 4,477,939 | 10/1984 | White et al. | 15/246.5 |
| 5,047,150 | 9/1991 | Mitchell | 210/527 |
| 5,108,586 | 4/1992 | Iwashige et al. | 210/219 |

FOREIGN PATENT DOCUMENTS 1 329 599  9/1970  United Kingdom .
1 429 853  12/1976  United Kingdom .

*Primary Examiner*—Robert J. Popovics
*Attorney, Agent, or Firm*—C. E. Martine, Jr.

[57] ABSTRACT

A header conduit provides an elongated passageway through which waste liquid and sludge ("waste") are guided and enter the conduit along a path that is tangential to at least the inner surface of the conduit which such incoming waste first contacts. When the conduit has an inner surface of circular cross-section, the passageway is elongated enough that the incoming waste enters the conduit along a path tangential to the circular surface. To better assure axial flow of the waste in the conduit to an outlet, the passageway provides both the tangential flow and is at an acute angle to the longitudinal axis of the conduit. The incoming waste is thereby provided with an axial component. In this manner, the passageway assures that the energy and momentum of the incoming waste is helical in direction. The waste previously admitted into the header conduit is urged by the newly entering waste to continue to flow helically in the conduit. The passageways are provided at spaced intervals along the length of the conduit to collect sludge from a wide area of the bottom of the basin. Because of the tangential orientation of each of the passageways and the resulting initial tangential flow of the incoming waste, the waste incoming from each of those multiple passageways reinforces the existing helical flow of waste in the conduit.

37 Claims, 12 Drawing Sheets

METHOD AND APPARATUS FOR HELICAL FLOW IN A HEADER CONDUIT

BACKGROUND OF THE INVENTION

1. Field of the Invention

This invention relates to removal of solids from liquid, and more particularly, to a header conduit for removing the solids from the liquid contained in a basin of a water or waste water treatment facility.

2. Discussion of Prior Header Conduits

Basins are used to collect certain materials and particles from liquid, to clarify the liquid. These materials are initially suspended in the liquid. They are subject to the force of gravity when the flow of the liquid is substantially reduced, as in a very low flow, or quiescent, zone (or flow channel) in the basin, and settle to the bottom of the basin. The settled materials and particles are removed from the bottom of the basin by being drawn into a header conduit that may traverse the bottom of the basin. Since these materials are generally solid and are said to "settle" out of the liquid, they are referred to as "settleable solids", or "settleable particulates". Upon settling onto the bottom they are generally referred to as "sludge". Such settleable solids may include naturally occurring materials (e.g., clay, silts, sand and dirt), chemical precipitants, biological solids, and stringy materials such as fibers. The words "material" or "solids" or "sludge" as used herein to describe the present invention refers to such all settleable solids and settleable particulates.

Basins are used, for example, in water and waste water treatment plants. In water treatment, the water drawn from a water supply has various non-settleable colloidal solids therein. When mixed with chemicals, the colloidal solids and chemicals agglomerate to form solids. In waste water treatment, the solids include organic solids, among other wastes. Water and waste water are treated in basins to remove such solids, thereby making the water clear and suitable for use, reuse, or for further treatment, such as tertiary treatment. The word "liquid" as used herein to describe the present invention refers to water and waste water.

An object of water and waste water basins is to create the quiescent zones having low flow rates to promote maximum settlement of the solids to the bottom of the basins. Typically, basins include a large area for containing the liquid and the solids where the settlement of the solids occurs. Such settlement has been promoted in small area basins by use of plate or tube settlers. Regardless of how the solids are caused to settle from the liquid in the basin, there is a need to remove the settled settleable solids and settleable particulates (i.e., the sludge) from the basin to provide room for additional solids and particulates which settle.

Various devices have been used in basins to remove the sludge from the basin. Among these are the well-known reciprocating sludge collector which co-inventor Meurer patented in 1983 in U.S. Pat. No. 4,401,576. Other sludge collectors have been mounted to pivot on an axis at the center of a circular basin. Whether the collector reciprocates or rotates on an axis in the basin, a header conduit of the collector is generally caused to move relative to the bottom of the basin into the sludge which collects on the bottom. Negative pressure is applied to one end, or to a central point, of the conduit in an attempt to cause the liquid and the sludge to flow from the bottom of the basin and enter apertures formed through the wall of the conduit. The apertures are generally formed by removing a portion of the wall of the conduit, which is typically a cylindrical pipe or a triangular cross-section conduit made from 14 gauge (75 mil) material. The liquid and the sludge enter the pipe in the direction of a diameter of the pipe, and for sludge removal must eventually turn so as to flow axially in the conduit toward the downstream point at which the negative pressure is applied to the pipe. Despite some developments in removal of sludge from basins, problems have been experienced in attempting to efficiently remove the sludge from the basin using such conduits.

SUMMARY OF THE PRESENT INVENTION

Applicants' studies of these problems indicates that the flow of sludge into such conduits has often become blocked upstream of the conduit as the conduits are moved into the sludge. The movement tends to compact the sludge ahead of the conduit, making it more difficult for the negative pressure applied to the conduit to cause the sludge to move toward and into the apertures. This difficulty is compounded by the requirement that in prior header conduits having such apertures, the incoming liquid and sludge must abruptly turn from the diametrical path and change direction under the action of the lower pressure liquid and the sludge previously admitted into the conduit. This change in direction dissipates some of the kinetic energy of the incoming liquid and sludge. As a result, back pressure tends to build up at the entrance to the aperture, the flow of sludge into the conduit slows, and the sludge tends to pile up in front of the conduit. In conduits having the basin, the sludge has been observed flowing over the conduit to the rear of the conduit, where it is less compacted and tends to flow down and into the aperture through what is a path of least resistance to the apertures.

This approach to sludge collection is inherently subject to inefficiencies because, for example, the build up of sludge in front of the conduit increases the energy needed to move the conduit through the sludge, rendering the sludge collection operation more costly.

Applicants' have further determined that the apertures of such conduits tend to become clogged with sludge. For example, in the treatment of waste liquids from so-called stone-washing operations performed on denim clothing, fibers from the denim material are dislodged from the clothing and have to be removed. These fibers are long, such as two inches. As the conduit is moved into the sludge, including into the fibers, and with the negative pressure applied to the conduit, the fibers flow toward the apertures and for sludge removal must turn just downward of the aperture at a right angle so as to flow into the axial length of the conduit. Due to the length of the fibers, and other factors, a fiber often becomes caught on the edge of the apertures, and causes other solids to collect there, thus clogging the aperture.

Applicants have also studied the flow of such liquids and sludge in such conduits. It appears to Applicants that the head loss in such conduits varies from one axial location to another axial location in the conduit as the flow of sludge and liquid moves downstream to the outlet to which the negative pressure is applied to the conduit. This appears to cause fluctuations, or pulses, in the flow. These head loss variations appear to result from the liquid and the sludge entering the conduit along such diametrical path, hitting against the wall of the conduit opposite to the aperture, and forming a mushroom-shaped volume of higher pressure (as the velocity of the incoming liquid and sludge is converted to pressure), before tending to turn and flow toward such inlet of the conduit. The presence of this higher pressure volume opposite to each aperture tends to restrict the rate of flow past each of the apertures, rendering the collection operation less efficient. Also, the varied pressure allows the sludge at the lower pressure locations to settle out of the flowing liquid and drop onto the bottom of the conduit where it tends to come to a stop. Once stopped, it takes more energy to overcome the inertia of the stopped sludge, and the stopped sludge tends to accumulate more sludge, further decreasing the efficiency of the collection operation.

The present invention seeks to overcome these and other limitations of the prior conduits by addressing each of the three above-discussed disadvantages of the prior conduits. In particular, Applicants' studies have concluded that the liquids and the sludge should enter the conduit along a well-defined path that is tangential to at least the inner surface of the conduit which is first contacted by such incoming liquid and sludge upon entering the conduit. When the conduit has an inner surface of circular cross-section, such incoming liquid and sludge should enter the conduit along such a path that is tangential to the circular surface. These studies indicate that the momentum of those incoming liquid and sludge in the tangential path causes them to immediately tend to assume a circular path within the conduit, such that much of the velocity of the incoming liquid and sludge is retained. Rather than flowing into the conduit and having to sharply turn, as with the apertures which have tended to block the easy flow into the conduit and cause the sludge to pile up in front of the conduit, the continued velocity of the incoming liquid and sludge encourages the sludge in front of the conduit to enter the conduit.

At the same time as such circular flow continues, the axial flow of the liquid and sludge previously admitted into the conduit, or an axial force at the closed end of the conduit, tends to cause the liquid and the sludge entering the conduit to have an axial component. As a result, those liquids and sludge newly admitted tangentially into the conduit flow axially and circularly within the conduit to the outlet, and retain much of the velocity they had when they entered the conduit. Further, such tangential flow into the conduit avoids catching the long fibers on an edge of the conduit, avoiding a problem of the prior art apertures.

Moreover, as is known in the art, multiple places are provided for the liquid and the sludge to enter the conduit. This is intended to assure removal of the sludge from all areas of the bottom of the basin. These studies indicate that the liquid and the sludge entering the conduit from each of those multiple places should reinforce, rather than hinder, the existing flow of the liquid and the sludge in the conduit. Applicants' provision of such tangential flow into the conduit tends to reinforce the circular flow in a circular cross-section conduit, or in another conduit having generally circular flow. This is done by having the newly incoming tangential flow join in the circular direction with the circular and axial flow of the liquid and sludge previously admitted into the conduit. This joining and resultant reinforced flow is contrary to the head loss periodically caused to occur in the prior art headers due to the mushrooming effect of the diametrically flowing liquid and sludge entering the conduit through the spaced apertures. With the joined and resultant flow continuing generally with the same (or somewhat increased) velocity as the flow passes each point of tangential entry of the liquid and sludge into the conduit, there are no places along the flow path to the outlet at which the sludge tends to settle out of the liquid.

With these and other features in mind, the conduit of the present invention provides a nozzle (rather than an aperture) through which the liquid and the sludge are guided and enter the conduit along a path that is tangential to at least the inner surface of the conduit which such incoming liquid and sludge first contact upon entering the conduit. When the conduit has an inner surface of circular cross-section, the nozzle is elongated enough that the incoming liquid and sludge enter the conduit along such path that is tangential to the circular surface. The nozzle organizes the incoming flow into the tangential path to assure that the momentum of those incoming liquid and sludge causes them to tend to assume a circular path within the conduit. As a result, much of the velocity of the incoming liquid and sludge is retained. The continued velocity of the incoming liquid and sludge in the circular path avoids undue back pressure at the inlet of the nozzle and encourages the sludge in front of the conduit to enter the conduit.

At the same time as the nozzle directs the liquid and sludge into the conduit in the tangential path and the circular flow thereof continues, the circular and axial flow (i.e., the helical flow) of the liquid and sludge which were previously directed into the conduit tends to cause the liquid and the sludge that have newly entered the conduit to develop an axial component so that the newly entered liquid and sludge join the helical flow of the previously admitted liquid and sludge. As a result, those liquids and sludge newly admitted into the conduit flow axially and circularly (in a helical path) within the conduit to the outlet, and retain much of the velocity they had when they entered the conduit. Such tangential flow into the conduit, followed by such helical flow, avoids catching the long fibers on an edge of the nozzle, avoiding a problem of the prior art apertures.

The conduit is designed to collect solids from a wide area of the bottom of the basin. Thus, the nozzles are provided at spaced intervals along the length of the conduit for the liquid and the sludge to enter the conduit and assure removal of the sludge from all areas of the bottom of the basin. Because of the tangential orientation of each of the nozzles and the resulting initial tangential flow of the incoming liquid and sludge, the liquid and the sludge incoming from each of those multiple nozzles reinforces, rather than hinders, the existing circular and axial flow (i.e., helical) of liquid and sludge in the conduit. Such reinforcement occurs in respect to the circular flow in a circular cross-section conduit, and in other conduits in which circular flow exists. The nozzle thus assures that the newly incoming flow joins in the circular direction with the helical flow of the liquid and sludge previously admitted into the conduit. This reinforced flow is contrary to the head loss periodically caused to occur in the prior art headers.

With these features of the present invention in mind, it may be understood that the present invention contemplates having the liquids and the sludge enter the conduit along a path that is tangential to at least the inner surface of the conduit which such incoming liquid and sludge first contact upon entering the conduit.

The present invention also contemplates providing a nozzle to direct the incoming liquid and sludge in a tangential path so that their momentum causes them to tend to assume a circular path within the conduit, such that much of the velocity of the incoming liquid and sludge is retained.

The present invention further contemplates providing a nozzle to admit the liquid and sludge in a circular flow in the conduit, with helical flow of liquid and sludge previously admitted into the conduit causing the liquid and the sludge that have newly entered the conduit to develop an axial component so that the newly entered liquid and sludge join the helical flow of the previously admitted liquid and sludge.

The present invention further contemplates having those liquids and sludge newly directed into the conduit flow in a helical path within the conduit to an outlet and retain much of the velocity they had when they entered the conduit.

The present invention further contemplates having the liquid and the sludge incoming from each of multiple places along the conduit reinforce, rather than hinder, the existing helical flow of liquid and sludge in the conduit, wherein tangential flow of the incoming liquid and sludge tends to accomplish this reinforcement.

The present invention further contemplates having a nozzle not only positioned to provide tangential flow into the conduit, but positioned at an acute angle with respect to the longitudinal axis of the conduit to provide the incoming liquid and sludge with an axial component independently of previously admitted liquid and sludge.

The present invention further contemplates having such nozzle assure that the energy and momentum of the incoming liquid and sludge is both circular and axial in direction, or in other words, to assure helical flow of the incoming liquid and sludge.

The present invention further contemplates having a pair of header pipes mounted adjacently, and reciprocating the pipes along the bottom of a basin and alternately into the sludge, wherein a front of each pipe faces the sludge as that pipe is moved into the sludge. Each of the pipes is capable of supporting helical flow of liquid and sludge therein. In each front of each of the pipes there is a nozzle for directing flowing sludge and liquid into the pipe along a path that is tangential to the helical flow in the pipe.

BRIEF DESCRIPTION OF THE DRAWINGS

Other features and advantages of the present invention will be apparent from an examination of the following detailed descriptions, which include the attached drawings in which.

DETAILED DESCRIPTION OF THE PREFERRED EMBODIMENTS

Basin 20

Figure 1:
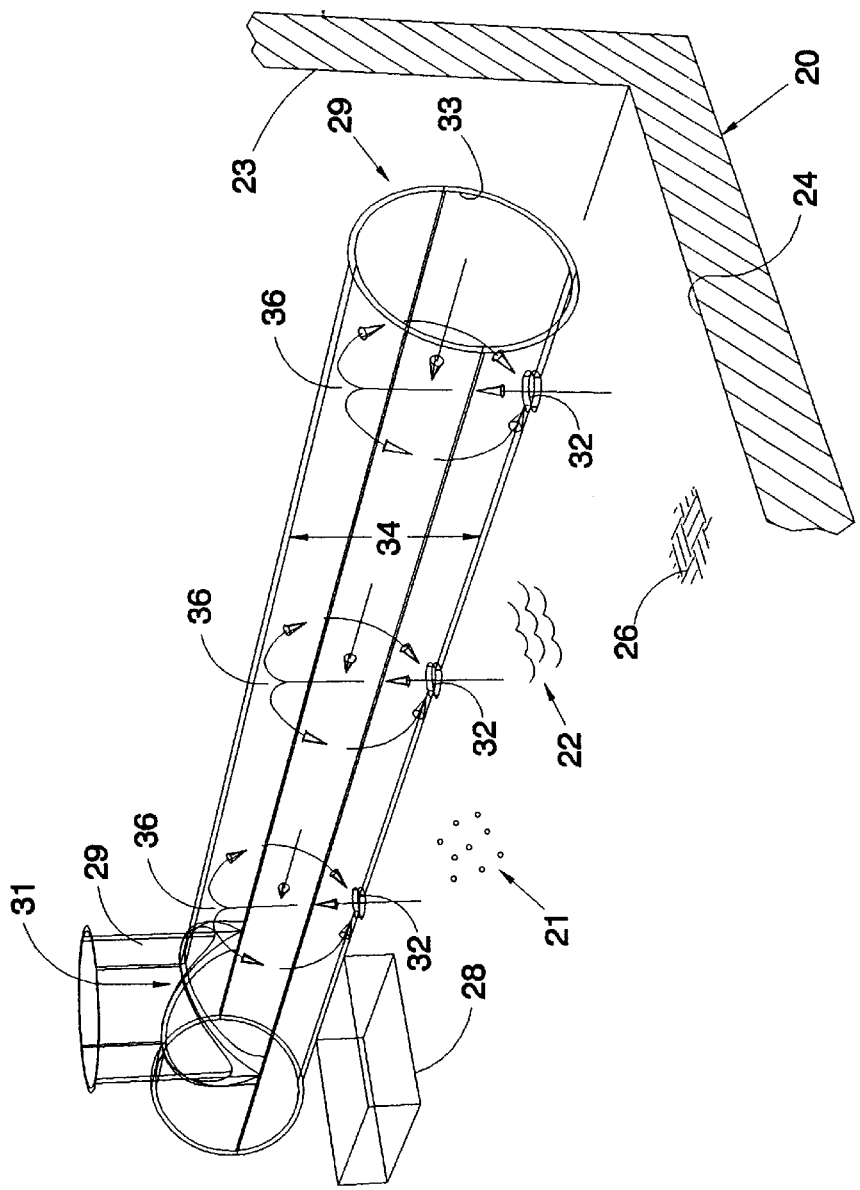
FIG. 1 is a three-dimensional view of a prior art header pipe showing liquid and material to be collected flowing in a straight path through an aperture in the pipe along a diameter of the pipe directly onto a wall of the pipe opposite to the aperture, and illustrating a mushroom effect of the incoming liquid and material to be collected as it hits the wall.
Figure 2:
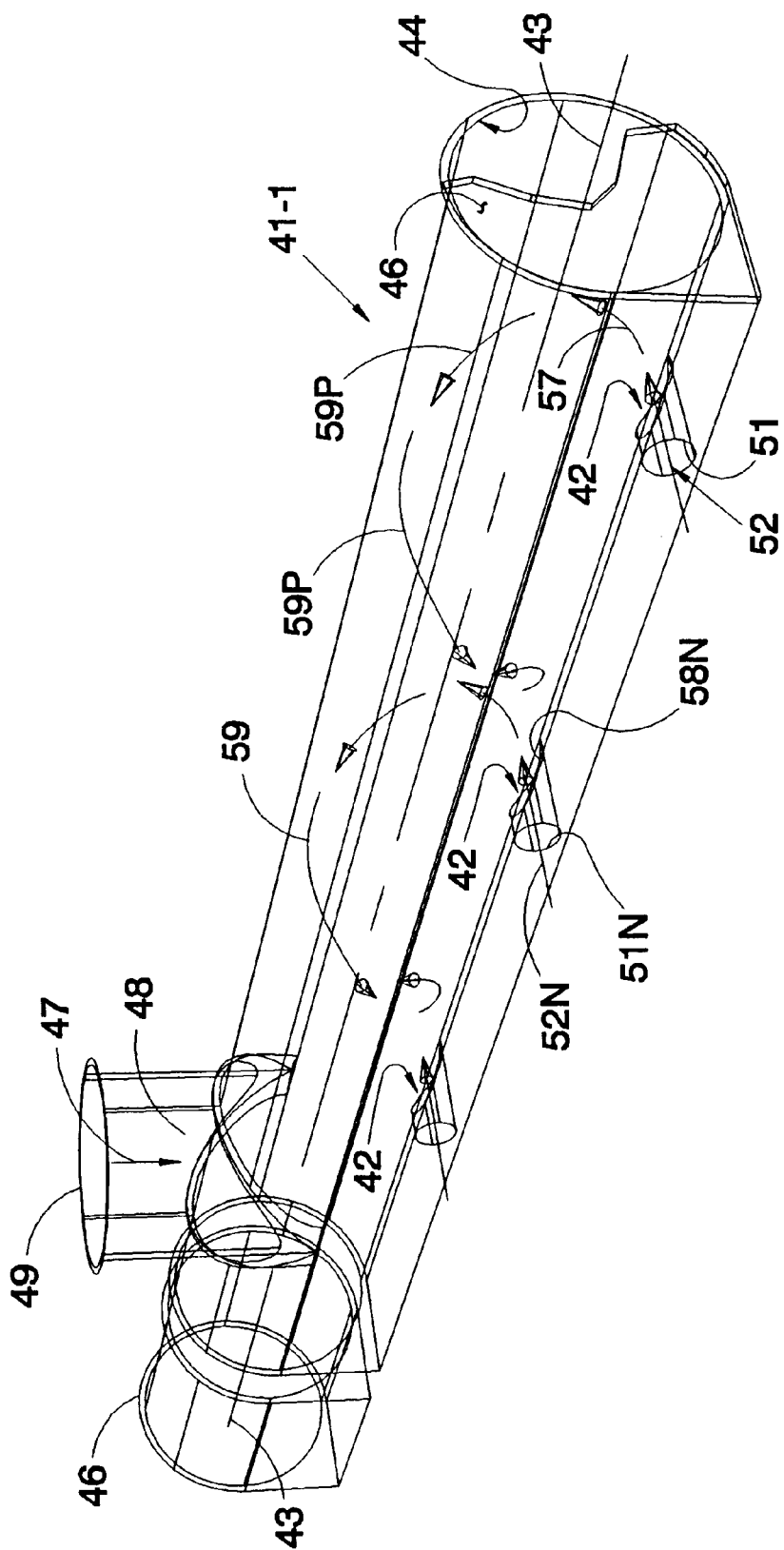
FIG. 2 is a three-dimensional view of a header conduit according to a first embodiment of the present invention showing a nozzle section of the conduit provided with a passageway for directing liquid and sludge to be collected in a straight path through an aperture in the pipe, wherein such path is tangential to a curved internal surface of the conduit to promote flow of the material and the liquid in a circular path in the conduit.

Referring to FIGS. 1 and 2, a basin 20 is shown for collecting materials 21 such as solids or particles from liquid or fluid, which is referred to as particle-laden liquid, or liquid 22. The solids may be settleable solids. The liquid 22 may be water or waste water, for example. The basin 20 has vertical outer walls 23 and an open top (not shown) and a bottom 24. The present invention may be used with any shaped basin 20, such as rectangular, circular or square basins. By way of various devices such as tube settlers (not shown), the flow of the liquid 22 and the solids 21 through the basin 20 is substantially reduced so that the settleable solids 21 settle out of the liquid 22. The settled solids 21 settle to the bottom 24 for removal by the header conduit and system of the present invention. As defined above, the settled solids 21 are referred to as "sludge" 26.

Traversing Mechanisms 27

Various devices 27 (FIG. 17) may be used to remove the sludge 26 from the basin 20. The disclosure of co-inventor Meurer's U.S. Pat. No. 4,401,576 is incorporated herein by this reference as showing such a device 27. The reciprocating sludge removal system there disclosed moved a carriage 28 back and forth in the basin 20. Other sludge removal units (not shown) have been mounted in a circular basin to move a carriage 28 in a circular path. Whether the removal device 27 reciprocates a carriage 28 or rotates a carriage 28 on an axis in the basin 20, a prior art header pipe 29 of the prior art device 27 (FIG. 1) is mounted on a carriage 28 that moves relative to the bottom 24 of the basin 20 into the sludge 26 which has collected on the bottom 24. Negative pressure is applied to an outlet 31 of the prior header pipe 29 in an attempt to cause the liquid 22 and the sludge 26 to flow from the bottom 24 of the basin 20 and enter apertures 32 formed through a wall 33 of the header pipe 29. The apertures 32 are generally formed by removing a portion of the wall 33 of the pipe 29, which is typically a cylindrical pipe or a triangular cross-section conduit made from 14 gauge (75 mil) material. The removed portion is generally at the bottom of the header pipe 29 and the liquid 22 and the sludge 26 enter the pipe 29 in the direction of a diameter 34 of the pipe 29. The wall 33 of the pipe 29 opposite to the aperture 32 causes the diametrically flowing liquid 22 and sludge 26 to split, to turn and reverse direction, forming a mushroom effect 36. The mushroom effect 36 tends to interfere with the desired turning of the liquid 22 and the sludge 26 to flow toward the downstream outlet 31 at which the negative pressure is applied to the pipe 29.

When the header pipe 29 has a triangular cross section (not shown), the apertures 32 are formed centrally in one bottom wall and the flow of the liquid 22 and the sludge 26 is into the pipe 29 toward an apex formed by the other two walls. This creates a mushroom effect similar to the mushroom effect 36, which also interferes with the desired turning of the liquid 22 and the sludge 26 to flow toward the downstream outlet 31 at which the negative pressure is applied to the pipe 29. Similarly, when the header pipe 29 has a rectangular or square cross section (not shown), the apertures 32 are formed centrally in one wall and the flow of the liquid 22 and the sludge 26 is into the pipe 29 toward the wall opposite to the apertures 32, creating a mushroom effect similar to the mushroom effect 36, which also interferes with the desired turning of the liquid 22 and the sludge 26 to flow toward the downstream outlet 31 at which the negative pressure is applied to the pipe 29.

Tangential Flow Header Conduit 41-1

First Embodiment of Header Conduit 41

Header conduits 41 of the present invention are shown in FIGS. 2–18 as being designed to overcome the limitations of prior header pipes such as the pipe 29. The header conduits 41 are designed addressing each of the three above-discussed disadvantages of the prior pipes 29. In FIG. 2, a first embodiment 41-1 of the header conduit 41 is shown having entrances 42 spaced along a longitudinal axis 43. The entrances 42 admit the liquid 22 and the sludge 26 to an inner or interior flow surface 44 extending from opposite, closed ends 46 a central point 47 at which a main outlet 48 applies negative pressure. The negative pressure tends to cause the liquid 22 and the sludge 26 to flow into the entrances 42, from the entrances 42 to the outlet 48 into a pipe 49 which carries the liquid 22 and the sludge 46 from the basin 20.

The header conduit 41-1 is designed with the entrances 42 in the form of a passageway 51 through which the liquid 22 and the sludge 26 flow from the basin 20 into the conduit 41-1. The passageway 51 maintains the liquid 22 and the sludge 26 in a well-defined path 52 that is tangential to at least a portion 53 (FIG. 4) of the inner surface 44 of the conduit 41-1 which is first contacted by such incoming liquid 22 and sludge 26 upon entering the conduit 41-1.

Figure 16A:
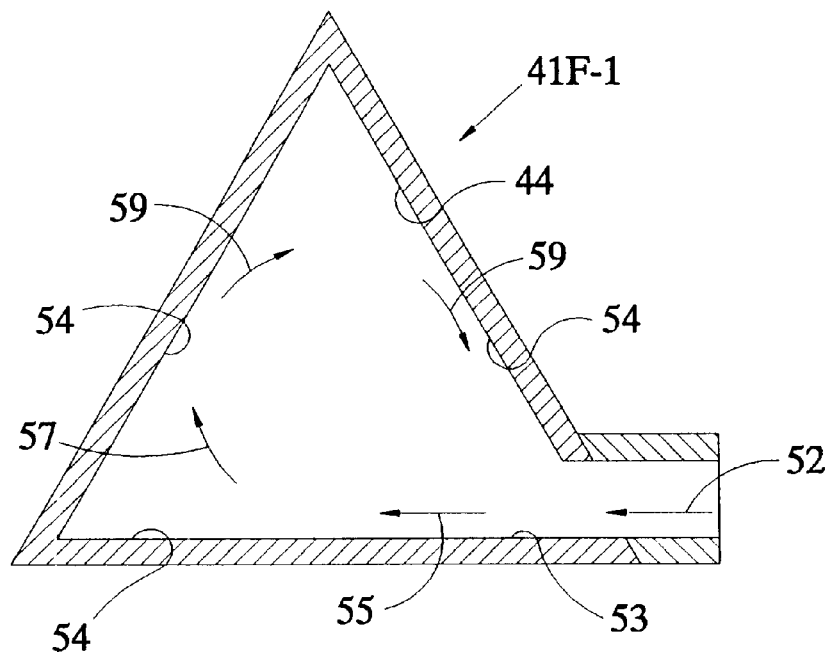
FIGS. 16A, 16B and 16C are cross sectional views of various conduits with which the present invention may be used to promote both circular flow and axial flow of materials to be removed and liquid in the conduit.
Figure 16B:
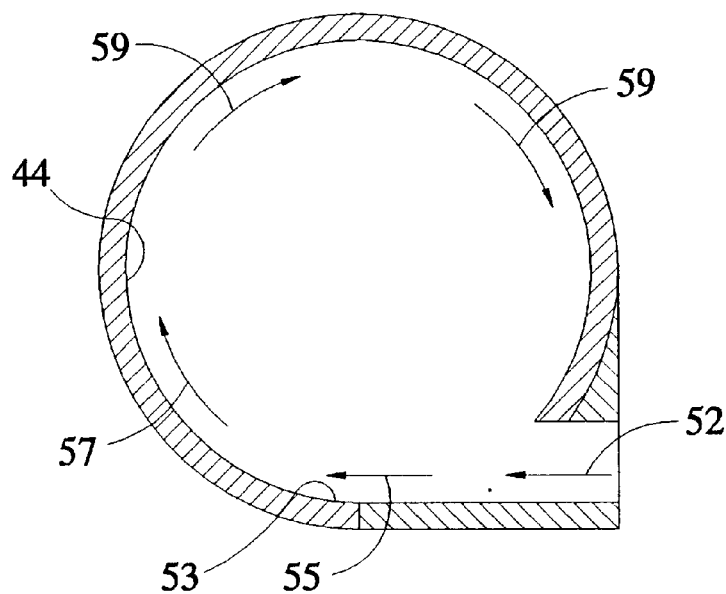
Figure 16C:
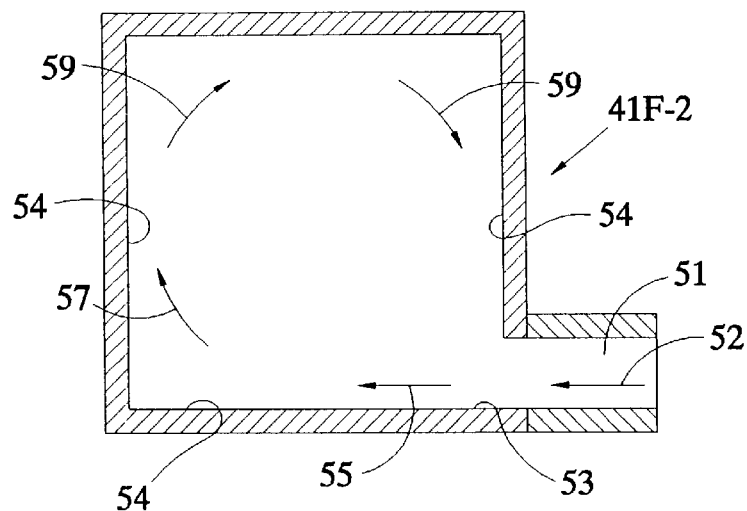

The conduit 41-1 may be triangular in cross section (see conduit 41F-1 in FIG. 16A) or circular in cross section (FIG. 16B), or have four sides 54, e.g., rectangular or square (see conduit 41F-2 in FIG. 16C). In any event, the liquid 22 and the sludge 26 from the passageway 51 are discharged into the conduit 41-1 in the well-defined tangential path 52. As shown in FIGS. 16A, 16B and 16C, in each case the contact with that portion 53 of the inner surface 44 is generally parallel to the surface of the portion 53. For the circular cross section header conduit 41-1 shown in FIGS. 2 and 16B, such path 52 is on a tangent 55, and for the header conduits 41F-1 and 41F-2 in respective FIGS. 16A and 16C such path 52 is parallel to such portion 53, and is said to be tangent thereto.

Figure 4:
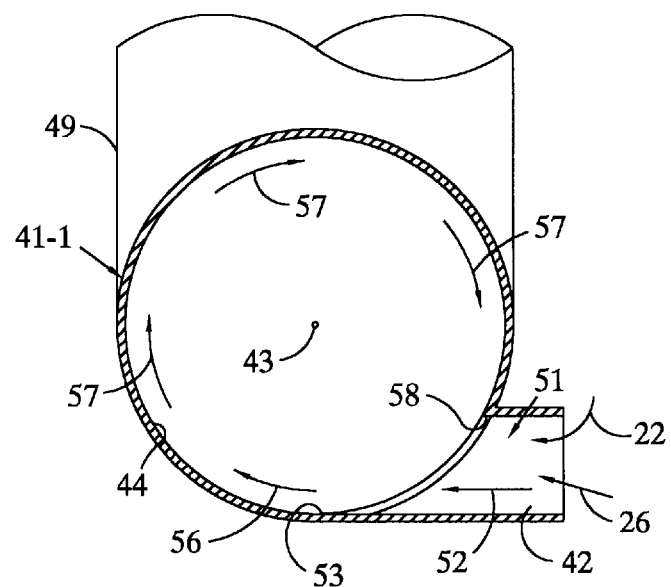
FIG. 4 is a cross sectional view taken on line 4—4 in FIG. 3 showing the tangential intersection of the passageway and such internal surface of the conduit.
Figure 5:
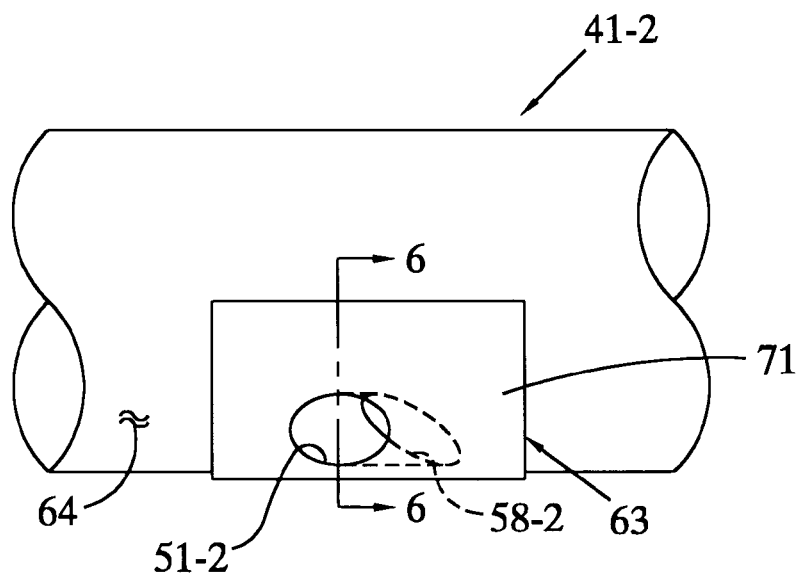
FIG. 5 is front elevational view of a nozzle section of a second embodiment of the present invention, in which the nozzle section may be placed outside the conduit to align a passageway with the aperture of the conduit yet direct the liquid and the sludge both tangentially and at an acute angle relative to the longitudinal axis of the conduit to promote helical flow in the conduit.

The circular conduit 41-1 is illustrated in FIG. 4 and may have an internal diameter of three to four inches, for example. The portion 53 of the circular inner surface 44 is shown starting to redirect the incoming liquid 22 and the sludge 26 (shown by an arrow 56) into a circular or curved path 57 as it flows past an outlet 58 of the passageway 51 into the header conduit 41-1. The momentum of those incoming liquid 22 and sludge 26 in the tangential path 52, and the smooth transition thereof onto the inner flow surface 44 of the conduit 41-1, cause those incoming liquid 22 and sludge 26 to immediately tend to assume the circular path 57 within the conduit 41-1, such that much of the velocity of the incoming liquid 22 and sludge 26 is retained. The circular flow 57 continues through 360 degrees.

Referring to FIG. 2, the ends 46 are shown closed, so that there is no place for the circular flow (arrow 57) of the liquid 22 and the sludge 26 to flow but axially toward the main outlet 48. Thus, the flow (arrow 57) shown in FIG. 4 as being circular immediately adjacent to the outlet 58 of the passageway 51, becomes helical (see arrow 59) as shown in FIG. 2. The helical flow 59 has both a circular component and an axial component in the direction of the longitudinal axis 43 of the header conduit 41-1.

Figure 3:
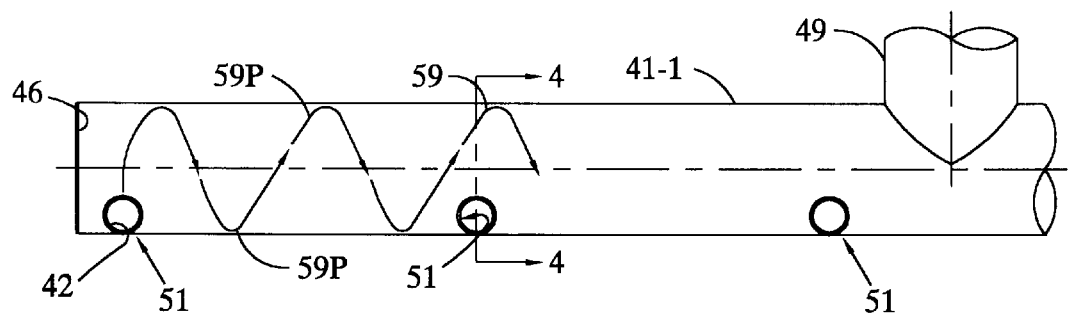
FIG. 3 is a front elevational view of the header conduit shown in FIG. 2.

As shown in FIG. 3, multiple passageways 51 are provided for the liquid 22 and the sludge 26 to enter the header conduit 41-1. This is intended to assure removal of the sludge 26 from all areas of the bottom 24 of the basin 20. The previously admitted liquid 22 and sludge 26 in the helical flow path 59 (shown as helical flow paths 59P) flow from the closed end 46 of the header conduit 41-1 circularly and axially toward the main outlet 48 of the header conduit 41-1 and past an outlet 58N (FIG. 2) of the next passageway 51N. At the passageway outlet 58N, the previously admitted liquid 22 and sludge 26 (arrows 59P in FIGS. 2 and 3) join the newly incoming liquid 22 and sludge 26 (shown by arrow 52N in FIG. 2). The helical direction of the flow 59P of the previously admitted liquid 22 and sludge 26 merges smoothly with the tangential flow 52N of the newly incoming liquid 22 and sludge 26, and reinforces that existing helical flow 59P. In other words, the helical momentum of the previously admitted liquid 22 and sludge 26 adds to the kinetic energy of the newly incoming liquid 22 and sludge 26 in the tangential direction to urge the newly incoming liquid 22 and sludge 26 into the header conduit 41-1 and in the helical path 59.

The same effect of parallel (tangential) incoming flow in the path 52, turning to circular flow at the portion 53, and then to helical flow 59, and reinforcing joining of the newly admitted flow 52N with the previously admitted flow 59P, is achieved in the flat-sided conduits shown in FIGS. 16A and 16C, although corners that are inherent in such flat-sided conduits reduce the efficiency of the transition from parallel (tangential) flow to circular flow 57. It may be understood, therefore, that the flat-sided conduits 41F-1 and 41F-2 permit the circular flow 57 and the helical flow 59 to occur therein despite having the flat sides 54, such that these conduits 41F-1 and 41F-2 may be described as being capable of supporting circular flow 57 of the liquid 22 and the sludge 26.

This joining of the flows 52N and 59P and resultant reinforced helical flow 59 is contrary to the head loss periodically caused to occur in the prior art pipes 29 due to the mushroom effect 36 of the diametrically flowing liquid 22 and sludge 26 entering the pipe 29 through the spaced apertures 32. With the joined and resultant helical flow 59 continuing generally with the same (or somewhat increased) velocity as the flow 59 passes each point of tangential (or parallel) entry of the liquid 22 and sludge 26 into the header conduit 41-1, there are no places along the flow path 59 to the main outlet 48 at which the sludge 26 tends to settle out of the liquid 22. This reduction of settled sludge 26 substantially reduces the need to provide maintenance services to keep the the inside of the header conduit 41 in operating condition.

Tangential and Axial Flow Into Header Conduit 41-2

Second Embodiment of Header Conduit 41

Figure 6:
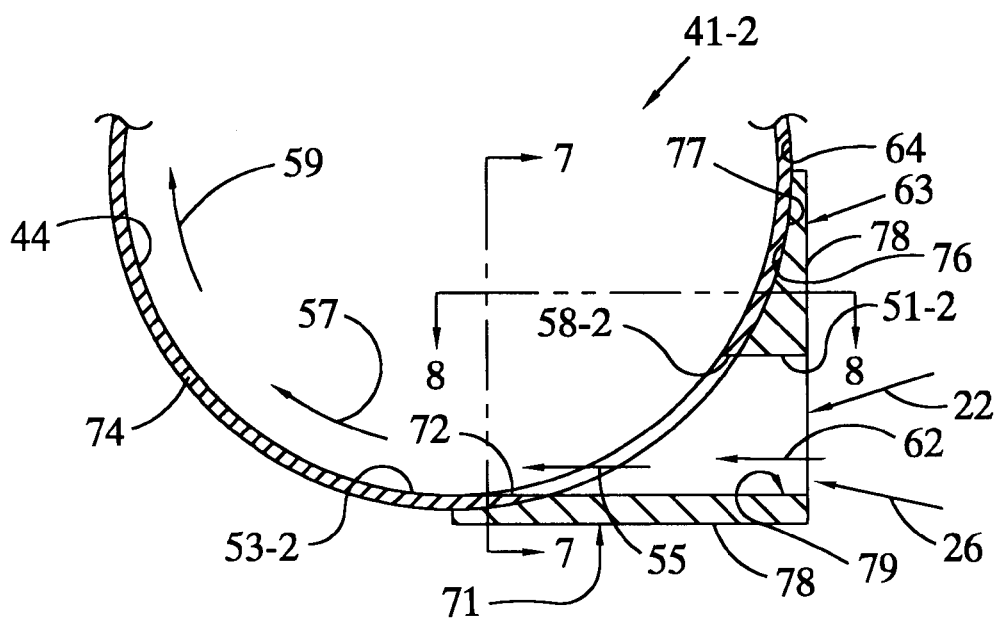
FIG. 6 is a cross sectional view of the nozzle taken along line 6—6 in FIG. 5, showing the passageway tangent to the internal surface of the conduit.
Figure 7:
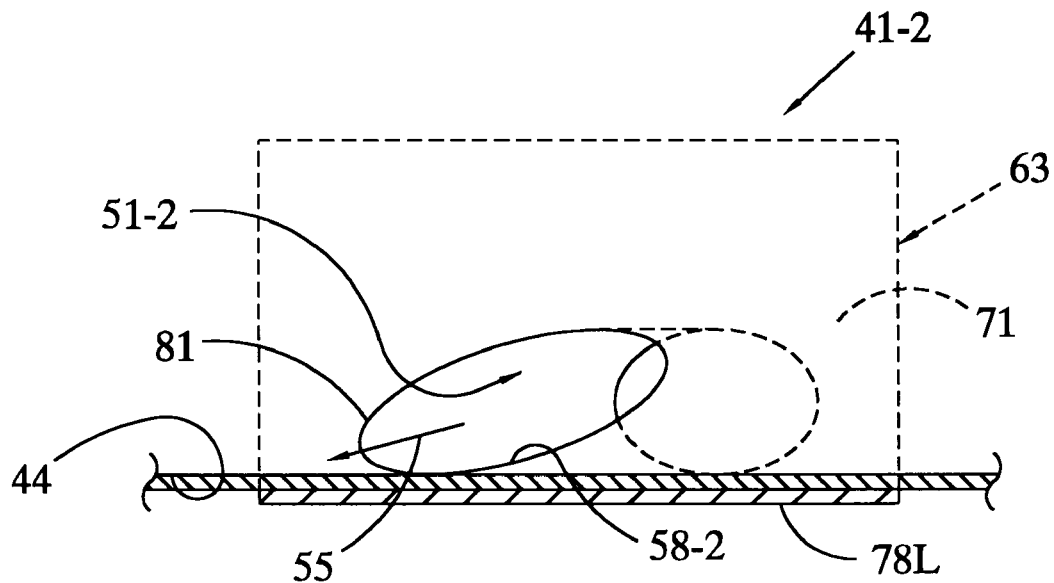
FIG. 7 is a cross sectional view taken along line 7—7 of FIG. 6 showing the passageway tangent to the internal surface of the conduit.
Figure 8:
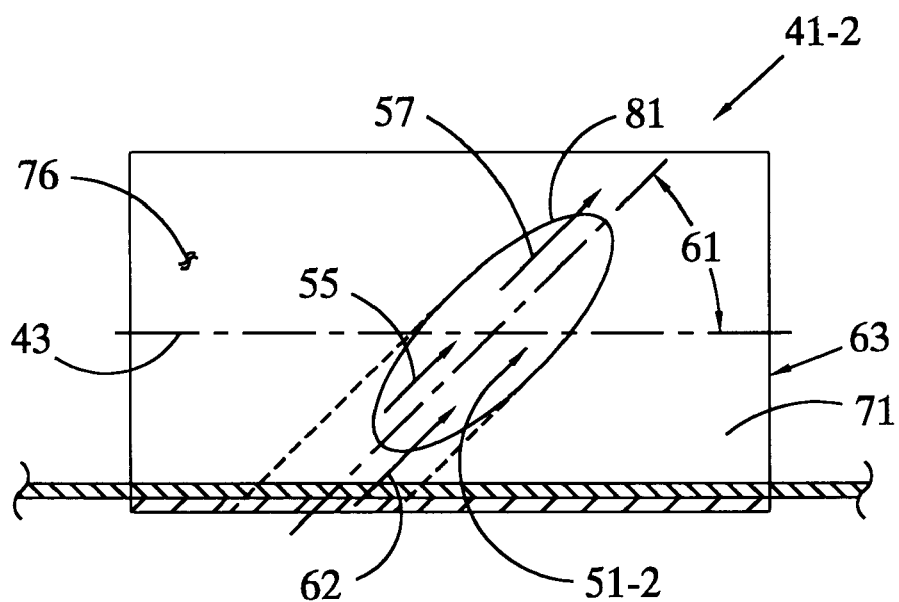
FIG. 8 is a cross sectional view of the nozzle of the second embodiment showing the acute angle of the passageway relative to the longitudinal axis of the conduit.
Figure 9:
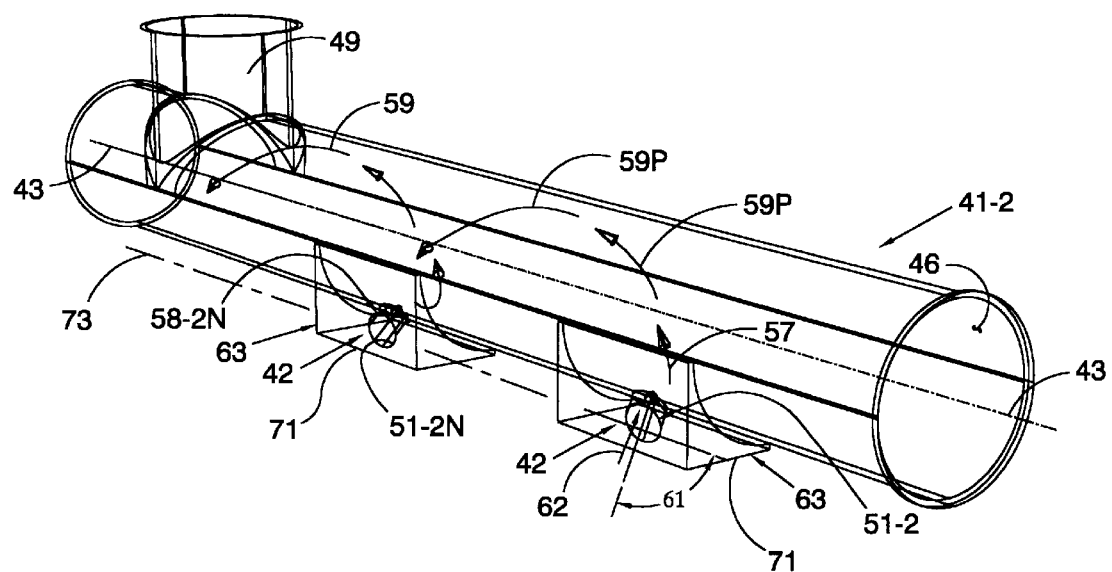
FIG. 9 is a three dimensional view of the second embodiment showing helical flow of the material and the sludge in the conduit.

Referring to FIGS. 5–9, a second embodiment of the header conduit 41 of the present invention, a header conduit 41-2, may have passageways 51-2 not only positioned to provide flow in the above-described tangential (or parallel) path 52 with respect to the inner flow surface 44 of the header conduit 41-2, but positioned at an acute angle 61 with respect to the longitudinal axis 43 to form flow 62 (FIGS. 6, 8 and 9). As shown in FIG. 9, the flow 62 of incoming liquid 22 and the sludge 26 are thus provided with an axial component independently of the momentum of previously admitted liquid 22 and sludge 26 which flow in the helical flow path shown by arrow 59P. As shown in FIGS. 5–9, there is a thick section 63 on the outer surface 64 (FIG. 5) of the header conduit 41-2. The passageway 51-2 is provided through the thick section 63. As in the passageway 51 shown in FIG. 4, the direction of flow in the passageway 51-2 is tangential (see arrows 55 in FIGS. 6–8) to the depicted circular cross section of the header conduit 51-2. However, as shown in FIGS. 8 and 9, the passageway 51-2 extends both tangentially with respect to the inner flow surface 44 and at the acute angle 61 with respect to the longitudinal axis 43. Referring to FIG. 6, as a result of this axial and tangential orientation of the passageway 51-2, as the portion 53-2 of the circular inner surface 44 starts to redirect the liquid 22 and the sludge 26 into the circular (or curved) path 57 as they flow past the outlet 58-2 of the passageway 51-2 into the header conduit 41-2, the total momentum of those incoming liquid 22 and sludge 26 has both tangential and axial vectors or directions. The smooth transition onto the inner flow surface 44 of the header conduit 41-2 is also achieved, and the incoming liquid 22 and sludge 26 immediately tend to assume the helical path 59 within the header conduit 41-2 without having to be redirected axially only by the previously admitted liquid 22 and sludge 26 (shown by arrow 59P in FIG. 9). As a result, more of the kinetic energy of the incoming liquid 22 and sludge 26 is used to flow the liquid 22 and the sludge 26 toward the main outlet 48 of the header conduit 41-2 than in the prior art pipes 29 shown in FIG. 1.

The helical flow 59 is shown in FIG. 9 continuing through 360 degrees. The passageway 51-2 having the tangential and axial orientation may be provided for each of the multiple entrances 42 which typically are provided to permit the liquid 22 and the sludge 26 to enter the header conduit 41-2. The liquid 22 and the sludge 26 previously admitted through one passageway 51-2 flows in the helical flow path 59P from the closed ends 46 of the header conduit, or from the next axial upstream passageway 51-2N (FIG. 9), toward the main outlet 48 of the header conduit 41-2 and past the outlet 58-2 of the next downstream passageway 51-2N. At the passageway outlet 58-2N (FIG. 9) of the next passageway 51-2N, the helically flowing previously admitted liquid 22 and sludge 26 (arrow 59P, FIG. 9) join the tangentially and axial flow 62 (FIG. 6) of newly incoming liquid 22 and sludge 26. The helical direction of the newly incoming flow 62 merges smoothly with the previously admitted flow 59P and reinforces the previously admitted helical flow 59P. The helical momentum of the previously admitted flow 59P adds to the kinetic energy of the newly incoming flow 62 of the liquid 22 and the sludge 26 in the tangential and helical directions and fosters the flow of newly incoming liquid 22 and sludge 26 into the header conduit 41-2 and toward the main outlet 48 of the header conduit 41-2.

Referring to FIGS. 5–9 in more detail, the second embodiment 41-2 of the header conduit 41 is shown provided with the thick section 63 in the form of a nozzle 71 which may be mounted over each of many existing apertures 72 (FIG. 6) formed in a standard cylindrical pipe (e.g., pipe 29), or the apertures 72 may be provided in a cylindrical header conduit 41-2 to function with the nozzles 71. The apertures 72 are on a line 73 (FIG. 9) parallel to the longitudinal axis 43 between the closed ends 46, and are generally circular holes having a diameter somewhat larger than the diameter of the passageway 51-2. The diameter of the passageway 51-2 may be one-half inch to two inches, for example. The sizes of the apertures 72 and of the passageways 51-2 are selected to achieve the above-described smooth merger of the flows 62 and 59P with no interference from any edges of the passageway 51-2 or the conduit 41-2 or the pipe 29; and to achieve the transition to the flow 57.

The header conduit 41-2 is positioned on the carriage 28 with the apertures 72 facing forward, i.e., facing in the direction in which the carriage 28 moves the header conduit 41-2 into the sludge 26 (to the right in FIG. 6).

Each of the nozzles 71 has the passageway 51-2 positioned to provide both the above-described tangential (or parallel) flow with respect to the inner flow surface 44 of the header conduit 41-2, and positioned at the acute angle 61 with respect to the longitudinal axis 43 of the header conduit 41-2 to provide the flow 62 of the incoming liquid 22 and sludge 26 with an axial component independently of the momentum of the previously admitted flow 59P. As shown in FIG. 6, the wall 74 of the header conduit 41-2 is generally thin, such as 75 mils. The nozzle 71 forms the thick section 63 of the header conduit 41-2, and has a curved side 76, the curvature of which matches that of the outer surface 77 of the header conduit 41-2. The nozzle 71 is secured to the outer surface 77 of the header conduit 41-2 using waterproof adhesive, for example.

Referring to FIG. 6, the nozzle 71 has flat sides 78 which extend from the curved side 76 and form a corner positioned outwardly from the thin wall 74 to provide structure in which the passageway 51-2 is formed. The passageway 51-2 is drilled or otherwise formed through the corner of the nozzle 71 and extends from a nozzle inlet 79 at or close to one of the flat sides 78 to the nozzle outlet 58-2. The passageway 51-2 enters the other flat side 78 (the right side in FIG. 6) so that a curved outlet portion 81 of the passageway 51-2 nearest the lower flat side 78L (FIG. 7) merges tangentially with the curved side 76 (FIG. 8) of the nozzle 71 and with the portion 53-2 (FIG. 6) of the inner surface 44 of the header conduit 41-2 which is first contacted by the incoming flow 62 upon flowing through the aperture 72 into the header conduit 41-2.

The length of the passageway 71 from the nozzle inlet 79 to the nozzle outlet 58-2 adjacent to such portion 53-2 of the inner surface 44 of the header conduit 41-2 is sufficient (e.g., one-half inch to two inches) to establish the straight-line flow 62. The nozzle 71 may be provided for each of the multiple entrances 42 which typically are provided to permit the liquid 22 and the sludge 26 to enter the header conduit 41-2.

Tangential and Axial Flow Into Header Conduit 41-3

Third Embodiment of Header Conduit 41

Figure 10:
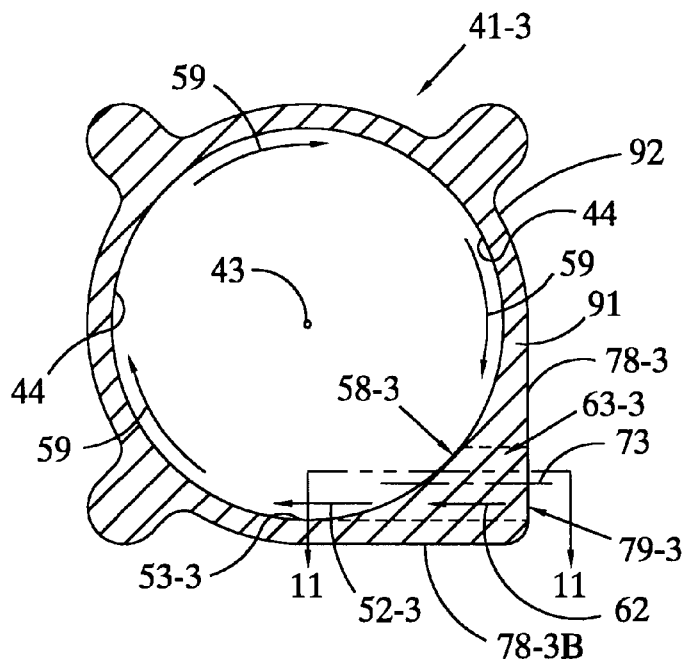
FIG. 10 is a cross sectional view of a third embodiment of the header conduit of the present invention showing the conduit extruded to have a thick wall section in which the passageway is formed for directing the liquid and sludge to be collected in a straight path tangentially to a curved internal surface of the conduit, which path is at an acute angle relative to the longitudinal axis of the conduit to promote the helical flow of the sludge and the liquid in the conduit.
Figure 11:
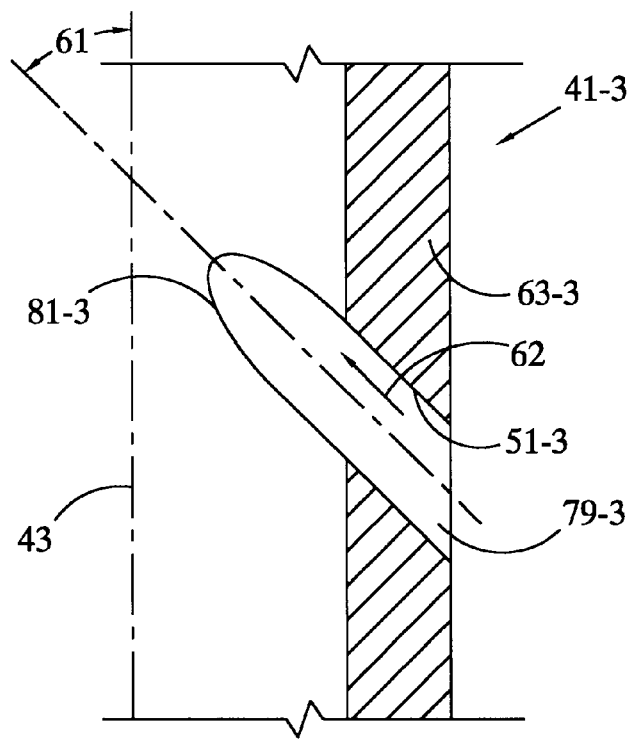
FIG. 11 is a cross sectional view taken along line 11—11 in FIG. 10, showing the passageway intersecting the conduit at the acute angle.

Referring to FIGS. 10 and 11, a third embodiment of the tangential and axial flow header conduit 41 (referred to via reference number 41-3) is shown being made by extrusion. The extruded header conduit 41-3 is provided with the opposite closed ends 46, an internal diameter of three to four inches, for example, and a generally thin wall 91, such as 75 mils thick, extending between the closed ends 46. The thick section 63-3 of the extruded header conduit 41-3 is extruded integrally with the wall 91 to form a corner extending between the ends 46. The passageways 51-3 are drilled or otherwise formed at spaced intervals through the thick section 63-3. Each passageway 51-3 is oriented to provide both the above-described tangential flow with respect to the inner flow surface 44, and positioned at the acute angle 61 (FIG. 11) with respect to the longitudinal axis 43 to provide the incoming flow 62 with an axial component independently of the momentum of the previously admitted flow 59P. The passageways 51-3 are on the line 73 parallel to the longitudinal axis 43 between the opposite closed ends 46, and may be sized and positioned as described above with respect to FIGS. 5 through 9.

The extruded header conduit 41-3 is positioned on the carriage 28 with the passageways 51-3 facing forward, i.e., facing in the direction (to the right in FIG. 10) in which the carriage 28 moves the header conduit 41-3 into the sludge 26 on the bottom 24 of the basin 20.

The extruded thick section 63-3 has the flat sides 78-3 which extend from the outer surface 92 (FIG. 10) of the walls 91 of the extruded conduit 41-3 to form the corner and provide structure in which the passageway 51-3 (FIG. 11) is formed. The passageway 51-3 extends from the nozzle inlet 79-3 at one of the flat sides 78-3 (right side in FIG. 10) to the nozzle outlet 58-3 (FIG. 10). The passageway 51-3 extends along or is adjacent to the other one of the flat sides 78-3 (shown as 78-3B in FIG. 10) so that the curved portion 81-3 (FIG. 11) of the passageway 51-3 nearest that flat side 78-3B merges tangentially with the portion 53-3 of the inner surface 44 of the header conduit 41-3 which is first contacted by the incoming flow 62.

In a manner similar to that described with respect to the second embodiment 41-2 and FIGS. 2–9, the passageway 41-3 in the extruded conduit 41-3 operates to establish the helical flow 59.

Tangential and Axial Flow Into Header Conduit 41-4

Fourth Embodiment of Header Conduit 41

Figure 12:
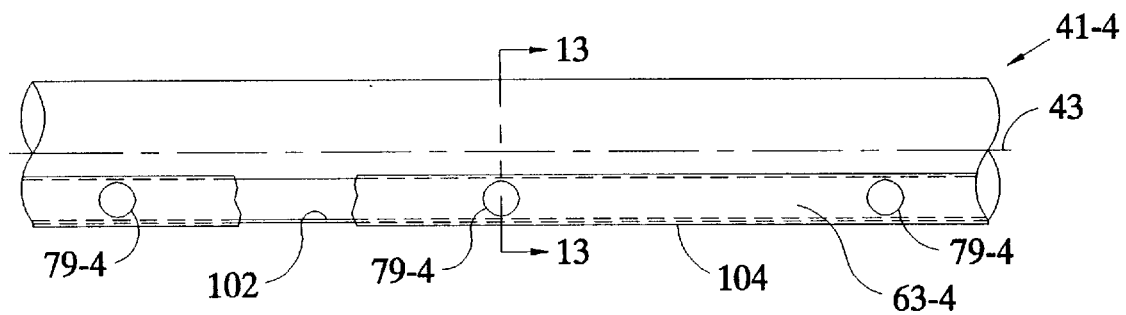
FIG. 12 is a front elevational view of a header conduit having a slot formed therein extending parallel to a longitudinal axis of the conduit, showing a fourth embodiment of the present invention including an insert secured to the slot and provided with a passageway to direct the liquid and materials both tangentially to an inner surface of the conduit and at an acute angle relative to the longitudinal axis to promote helical flow in the conduit.
Figure 13:
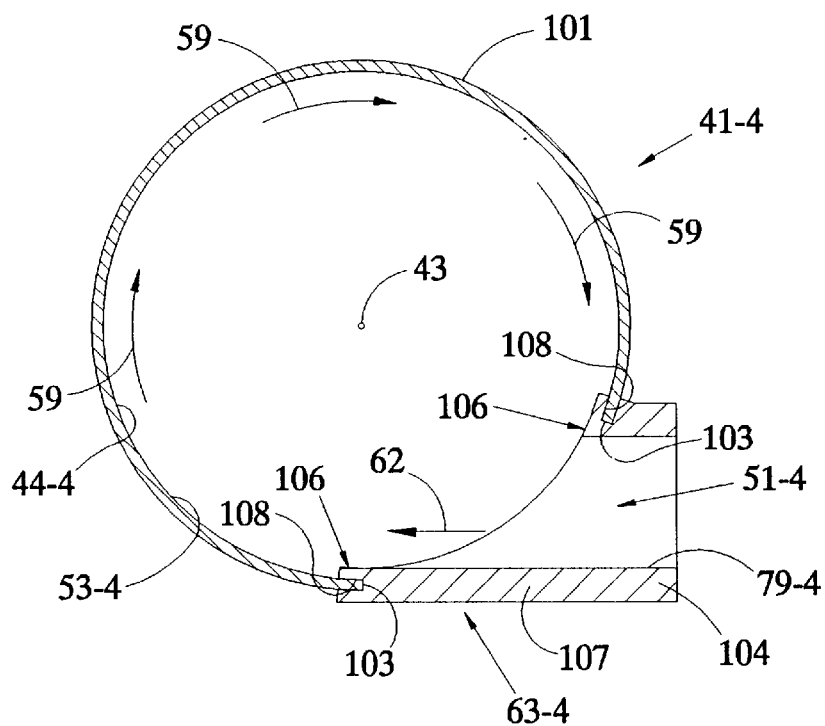
FIG. 13 is a cross-sectional view taken along line 13—13 of FIG. 12, illustrating the insert with the passageway and opposed notches which cooperate with the slot to secure the insert to the conduit.

Referring to FIGS. 12 and 13, a fourth embodiment of the header conduit 41 is shown as a tangential and axial flow header conduit 41-4. The conduit 41-4 is provided with the opposite closed ends 46 and a generally thin wall 101, such as 75 mils thick extending between the closed ends 46 to provide the curved internal flow surface 44-4 for guiding the liquid 22 and sludge 26 to the main outlet 48 (FIG. 2). As in some standard header conduits, the header conduit 41-4 is provided with a slit or elongated opening 102 extending between the opposite closed ends 46 parallel to the longitudinal axis 43. The slit 102 is defined by opposing edges 103 (FIG. 13) of the thin wall 101. An end (not shown) of the slit 102 is adjacent to one of the closed ends 46.

According to the present inventions and referring primarily to FIG. 13, a thick section 63-4 of the header conduit 41-4 is shown as an elongated flow director (or insert) 104 that is inserted into the slit 102. The flow director 104 may be extruded or machined, for example, and is provided with a pair of retainer sections 106 on opposite sides of a flow section 107 integral with the retainer sections 106. The retainer sections 106 have opposed notches 108 receiving the respective opposite conduit edges 103 to retain the flow director 104 in the slit 102.

The flow section 107 extends externally of the retainer sections 106, and is external to the header conduit 41-4 in the same manner as the thick section 63-3 of the third embodiment 41-3. In a manner similar to the second embodiment 41-2 described above in respect to FIGS. 2–9, passageways 51-4 are drilled or otherwise formed at spaced intervals through the flow section 107 and are oriented to provide both the above-described tangential flow 52 with respect to the inner flow surface 44-4 and positioned at the acute angle 61 with respect to the longitudinal axis 43 of the header conduit 41-4 to provide the incoming flow 62 with the axial component. The header conduit 41-4 is positioned on the carriage 28 with the inlets 79-4 to the flow director 104 facing forward, i.e., facing in the direction in which the carriage 28 moves the header conduit 41-4 into the sludge 26.

Tangential and Axial Flow Into Header Conduit 41-5

Fifth Embodiment of Header Conduit 41

Figure 14:
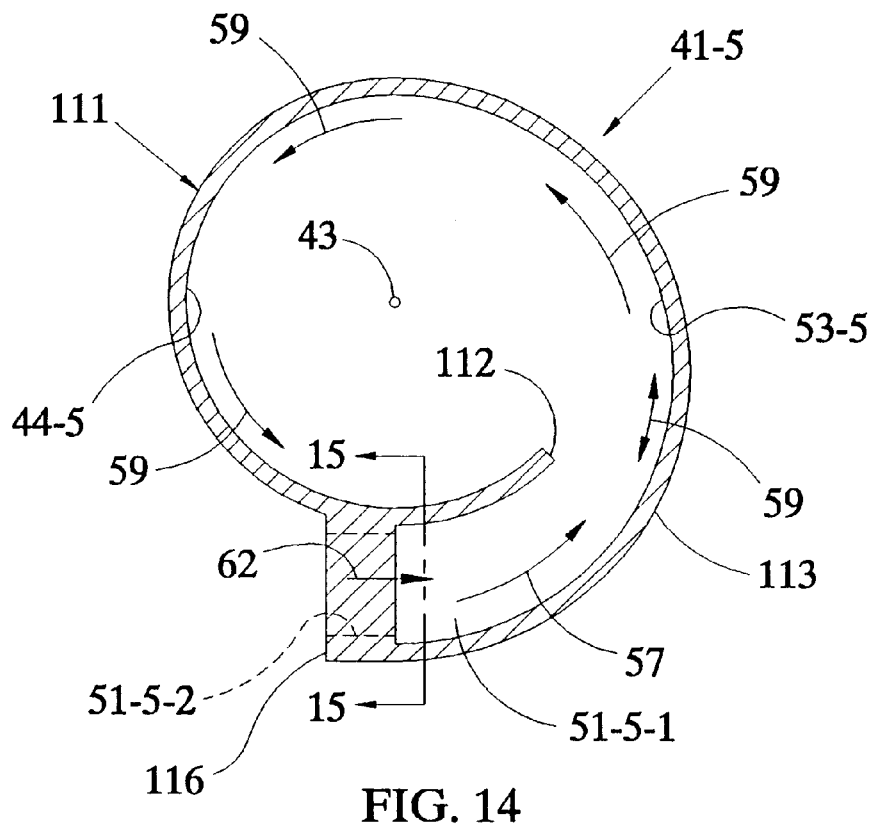
FIG. 14 is a cross sectional view of a fifth embodiment of the present invention illustrating a spirally-shaped conduit with an integral flow director, wherein the conduit has a discontinuous internal wall and an outer wall overlapping the internal wall, wherein the passageway is defined between the internal and outer walls.
Figure 15:
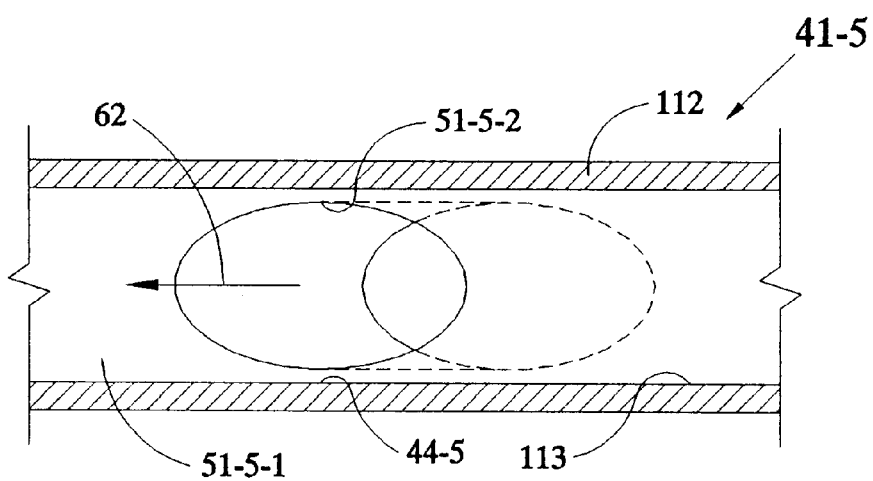
FIG. 15 is a front elevational view of the conduit shown in FIG. 14, illustrating the tangential and acute axial direction of flow promoted by the passageway.

Referring to FIGS. 14 and 15, a fifth embodiment of the header conduit 41 is shown as an extruded tangential and axial flow header conduit 41-5. The extruded header conduit 41-5 is provided with opposite closed ends 46 and a multi-section generally thin, such as 75 mils thick, wall 111 extending between the closed ends 46 to provide the curved internal flow surface 44-5 for guiding the liquid 22 and the sludge 26 to the main outlet 48. Viewed in cross section (FIG. 14), the inner surface 44-4 is discontinuous at an end 112 and has an outer section 113 extending at a greater radial distance than the end 112, so that the outer section 113 overlaps the end 112. The overlapping section 113 extends circumferentially and in the overlapping manner to define a first section 51-5-1 of the passageway 51-5. The overlapping outer section 113 extends to an entrance 116 having a second passageway section 51-5-2 therein. The passageway sections 51-5-1 and 51-5-2 combine to form the passageway 51-5 which directs the incoming flow 62 as described above with respect to FIGS. 2–9 to foster the helical flow 59.

In the embodiments 41-2 through 41-5, according to the requirements of the liquid 22 and the sludge 26 which are being collected, for example, the acute angle 61 of one passageway 51 may be different from the acute angle 61 at which another one of the passageways is positioned.

Although the embodiments 41-2 through 41-5 of the header conduit 41 have been described as providing the axial and tangential flow 62, it is to be understood that header conduits 41 may be provided with the structures of any of the embodiments 41-2 through 41-5, but having the passageways therein positioned to provide only tangential flow 55.

Dual Header Conduits 41

Figure 17:
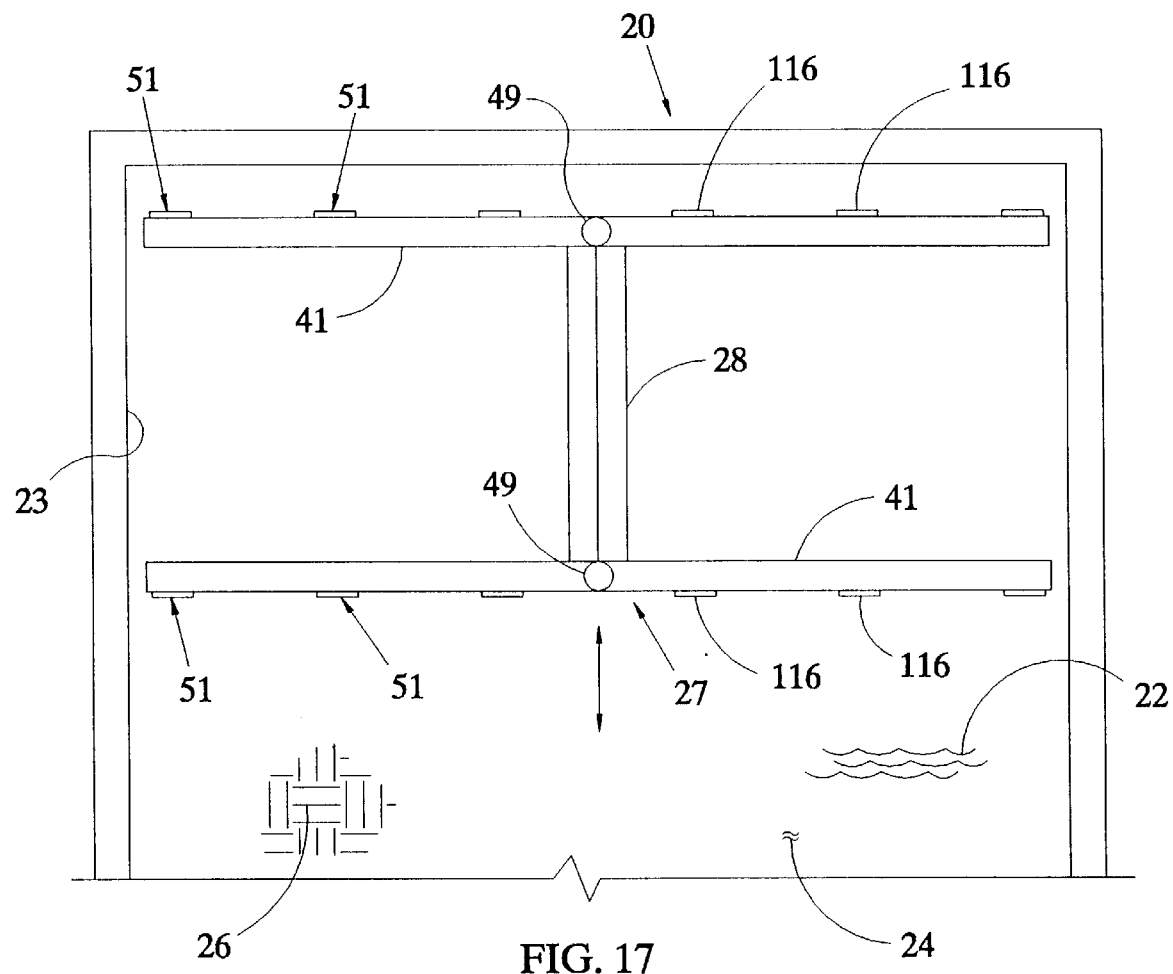
FIG. 17 is a plan view of a basin showing a traversing mechanism having a carriage movable from one of the ends of the basin to an opposite one of the ends of said basin to enable the header conduits of the present invention to collect material and liquid from the basin.

Referring to FIG. 17, the present invention may be used by providing a pair of any of the embodiments 41-1 through 41-5 of the header conduits 41 mounted adjacently in parallel relationship on the carriage 28. The carriage 28 reciprocates the header conduits 41 along the bottom 24 of the basin 20 and alternately into the sludge 26. One of the header conduits 41 faces one direction of travel, whereas the other header conduit 41 faces in the other direction of travel, so that regardless of the direction of travel of the carriage 28, there is at least one, and preferably many, passageways 51 facing the direction of travel for receiving the liquid 22 and the sludge 26 according to the principles of the present invention. In particular, a front 116 of each header conduit 41 faces the sludge 26 as that conduit 41 is moved into the sludge 26. The header conduit 41 is capable of supporting the helical flow 59 of the liquid 22 and the sludge 26 therein.

Tangential Outlet Pipe 49-2

Figure 18:
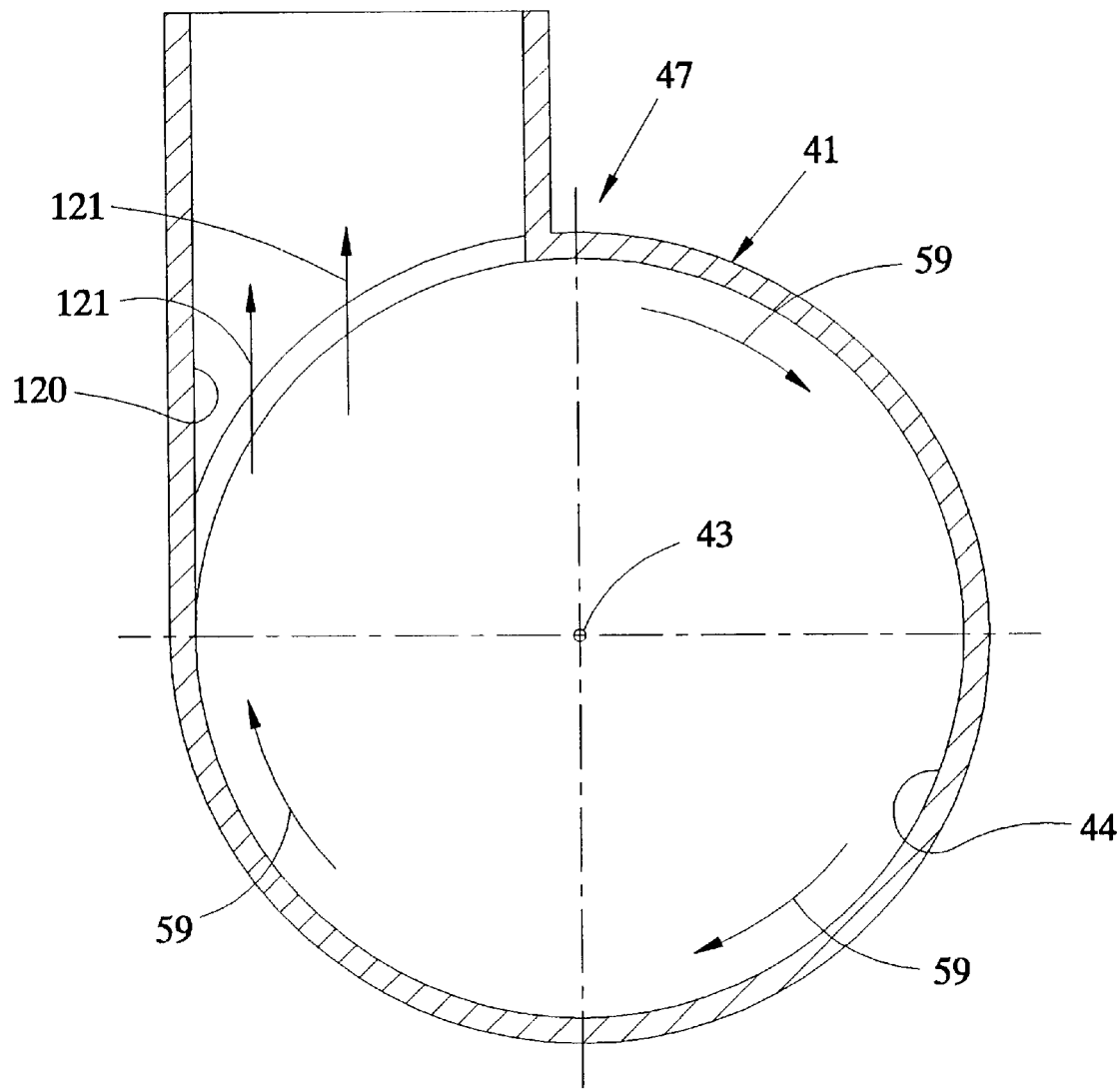
FIG. 18 is a cross sectional view of an outlet of a header conduit of the present invention showing a tangential connection between the curved internal surface of the conduit and the outlet.

As described with respect to FIG. 2, the entrances 42 admit the liquid 22 and the sludge 26 to the interior flow surface 44 which extends from the opposite, closed ends 46 a central point 47 at which the outlet pipe 49 applies negative pressure. As shown in FIG. 18, another embodiment of the outlet pipe 49-2 may be used to take full advantage of the helical flow 59 in the header conduit 41. The outlet pipe 49-2 is mounted to the header conduit 41 between the ends 46 so that an internal surface 120 of the outlet pipe 48-2 is tangent to the interior flow surface 44 of the header conduit 41. In this manner, as the helical flow 59 (shown in FIG. 9 as continuing through 360 degrees in the header conduit 41-2) reaches the outlet pipe 49-2, there is a smooth transition of the flow 59 from the interior flow surface 44 to flow 121 of the liquid 22 and the sludge 26 onto the internal surface 120 of the outlet pipe 49-2. Moreover, the circular momentum of the helical flow 59 assists in urging the flowing liquid 22 and sludge 26 radially outward from the header conduit 41 into the outlet pipe 49-2.

Although the relative dimensional relationships between the outlet pipes 49 or 49-2 and the header conduit 41 are not shown in FIGS. 2, 9, 17, or 18, it is to be understood that the area of the outlet pipes 49 or 49-2 is sized to accept the flow of the liquid and the sludge 26 from both ends of the header conduit 41.

The foregoing description of the present invention illustrates and describes the invention and is not intended to limit the invention to the form disclosed herein. The embodiments disclosed are intended to describe the best modes known of practicing the invention and to enable others skilled in the art to use such invention in such or other embodiments. It is intended that the appended claims be interpreted so as to include alternative embodiments to the extent permitted by the prior art.

What is claimed is:

1. A conduit for collecting material from a collector surface on which the material rests, said conduit having a collector section bounded by opposite closed ends; said collector section having an internal flow surface provided with at least one aperture formed through said internal flow surface between said opposite ends for admitting said material from said collector surface; said conduit comprising:

said conduit being provided with a plurality of passageways, one of said passageways intersecting said at least one aperture when said at least one aperture is one aperture, each of said passageways intersecting a respective one of said at least one aperture when said at least one aperture is a plurality of apertures, said passageways being external to said internal flow surface, and said passageways being elongated and tangentially intersecting said internal flow surface via said at least one aperture.

2. A conduit according to claim 1, wherein said conduit has a nozzle section separate from said collector section; said passageways being formed in said nozzle section; and said nozzle section is secured to said conduit with said passageways aligned with said at least one aperture.

3. A conduit according to claim 1, wherein said conduit has a thin wall section extending along a longitudinal axis of said conduit and defining said internal flow surface; and wherein said conduit has an axially extending thick wall section of greater thickness than said thin wall section and extending along at least a portion of said thin wall section; and wherein said passageways are formed in said thick wall section.

4. A conduit according to claim 1, wherein said conduit is extruded.

5. A conduit according to claim 1, wherein said collector section of said conduit is generally tubular and has discontinuous portion; and said discontinuous portion comprising an axially extending edge and a second portion overlapping said axially extending edge.

6. A conduit according to claim 1, wherein said conduit is generally tubular and said at least one aperture is an axially extending slit, said slit being defined by opposing edges; wherein said conduit is provided with an inlet comprising a flow section and a retainer section integral with said flow section, said retainer section having opposed notches receiving said respective conduit edges to retain said inlet in said slit, said flow section being external to said conduit and having said passageways therein.

7. A conduit according to claim 1, further comprising:

an outlet pipe connected to said conduit between said ends, said outlet pipe having an interior surface tangentially intersecting said internal flow surface.

8. In a header conduit for collecting settled material and liquid from a collector surface of a basin, said conduit having a collector section bounded by opposite, closed ends and having an internal surface capable of supporting circular flow of the liquid and the settled material, said conduit having a longitudinal axis along said internal surface, said conduit being formed with a series of material collection holes therein between said opposite closed ends, said holes being formed through said internal surface along a line extending parallel to said axis, one of said holes being adjacent to one of said closed ends; the improvement in said conduit comprising:

a flow director on said header conduit and having a passageway for each of said holes extending therethrough and aligned with a respective one of said holes, each of said passageways tangentially intersecting said internal surface adjacent to each of said holes.

9. In a header conduit according to claim 8, the improvement further comprising:

one of said passageways aligned with said one hole adjacent to said one closed end also being at an acute angle with respect to said longitudinal axis.

10. In a header conduit according to claim 8, wherein said internal surface capable of supporting circular flow has a circular cross-section, the improvement further comprising:

said passageways tangentially intersecting said internal circular surface adjacent to each of said holes to direct the material and the liquid into said conduit for said circular flow in said conduit.

11. In a header conduit according to claim 10, the improvement further comprising:

one of said passageways aligned with said one hole adjacent to said one closed end also being at an acute angle with respect to said longitudinal axis to direct the material and the liquid into said conduit for both said circular flow and axial flow in said conduit to encourage the material and the liquid to have a helical flow path in said conduit.

12. In a header conduit according to claim 8, wherein said internal surface capable of supporting circular flow has a triangular cross-section provided with at least two intersecting flat surfaces, the improvement further comprising:

said passageways tangentially intersecting said internal surface having said internal triangular cross section being effective to direct the material and the liquid into said conduit generally parallel to one of said flat surfaces before flowing toward said other one of said flat surfaces to enable said circular flow to be established in said conduit.

13. In a header conduit according to claim 8, wherein said internal surface capable of supporting circular flow has a rectangular cross-section provided with at least two intersecting flat surfaces, the improvement further comprising:

said passageways tangentially intersecting said internal surface having said internal rectangular cross section being effective to direct the material and the liquid into said conduit generally parallel to one of said flat surfaces before flowing toward said other one of said flat surfaces to enable said circular flow to be established in said conduit.

14. A header conduit according to claim 8, said header conduit further comprising:

said flow director being provided in the form of one nozzle separate from said collector section and for each of said holes; said passageway being formed in each of said nozzles; and each of said nozzles being secured to said conduit with said respective passageway aligned with said at least one aperture.

15. A header conduit according to claim 8, wherein said conduit has a thin wall section extending along said longitudinal axis and defining said internal surface; said header conduit further comprising:

said header conduit having an axially extending thick wall section of greater thickness than said thin wall section and extending along at least a portion of said thin wall section; and each of said passageways being formed in said thick wall section.

16. A header conduit according to claim 8, said header conduit further comprising:

said collector section of said header conduit being generally tubular; and said flow director having discontinuous portion comprising an axially extending edge and a second portion overlapping said axially extending edge, said passageway being defined between said edge and said overlapping portion.

17. A header conduit according to claim 8, said header conduit having an outlet for the collected liquid and material, said outlet being between said closed ends, said header conduit further comprising:

each of said passageways that is aligned with said hole adjacent to said one closed end also being at an acute angle with respect to said longitudinal axis and facing toward said outlet to introduce some of the liquid and the material into said header conduit and direct said circular flow generally in the form of a helix; and each of said passageways aligned with said holes between said closed ends also being at an acute angle with respect to said longitudinal axis and facing toward said outlet to admit more of the liquid and the material into said header conduit generally in the form of a helix that joins and reinforces the previously introduced liquid and the material to continue said circular flow generally in the form of a helix.

18. In a header conduit for collecting settled material and liquid from a collector surface of a basin, said conduit having a collector section bounded by opposite, closed ends and an outlet for the collected liquid and materials between said closed ends, said header conduit having an internal surface capable of supporting circular flow of the liquid and the settled material, said conduit having a longitudinal axis along said internal surface, said conduit being provided with an axially extending slit therein between said opposite closed ends along a line extending parallel to said axis, said slit being defined by opposing edges; an end of said slit being adjacent to one of said closed ends; the improvement in said header conduit comprising:

a flow director on said header conduit and having a plurality of passageways therein, said flow director having a flow section and a retainer section integral with said flow section, said retainer section having opposed notches receiving said respective conduit edges to retain said flow director in said slit, said flow section being external to said header conduit and having said passageways to direct the settled material and the liquid through said slit and into tangential intersection with said internal surface.

19. In a header conduit according to claim 18, the improvement further comprising:

said outlet having an interior surface extending tangentially with respect to said internal surface.

20. A header conduit according to claim 18, said improvement further comprising:
one of said passageways being adjacent to each of said closed ends, said one passageway also intersecting said internal surface at an acute angle with respect to said longitudinal axis and facing away from said adjacent closed end to tend to establish said circular flow of the liquid and the settled material in the form of helical flow originating from said closed end and extending toward said outlet.

21. In a system for collecting material from a collector surface in a basin having opposite ends and which is adapted to contain the material and liquid, said system including a traversing mechanism designed to move from one of said ends of said basin to an opposite one of said ends of said basin, said system including a conduit mounted on said traversing mechanism for movement in a first direction and having a collector section bounded by opposite closed ends, said collector section having an internal flow surface provided with at least one aperture formed through said internal flow surface between said opposite ends and facing said first direction for admitting the material from said collector surface, said conduit also including an outlet between said ends for removing the material and liquid from said collector section, the improvement in said system comprising:
said conduit being provided with a plurality of passageways, one of said passageways intersecting said at least one aperture when said at least one aperture is one aperture, and each of said passageways intersecting one of said at least one aperture when said at least one aperture is a plurality of apertures,
each said passageway being external to said internal flow surface and having an entrance, upon said traversing mechanism moving in said first direction each said passageway being positioned ahead of said conduit for movement into the material on said collector surface, and
each said passageway being elongated from said entrance and having an exit tangentially intersecting said internal flow surface via said respective aperture to supply the material and the liquid into said conduit for flow to said outlet.

22. In a system according to claim 21, wherein said conduit has an exterior surface, the further improvement comprising:
a pipe connected to said outlet of said conduit for applying low pressure to said internal surface to urge the material and the liquid from said aperture to said outlet;
said conduit having a nozzle section corresponding to each said aperture and separate from said collector section, said passageways being formed in respective ones of said nozzle section to direct the material and the liquid tangentially onto said internal surface for flow in a circular path toward said outlet; and
said nozzle section being secured to said exterior surface of said conduit with each one of said passageways aligned with a respective one of said apertures.

23. In a system according to claim 22, wherein said conduit has a longitudinal axis extending from one of said ends and past said outlet to said other one of said ends, the further improvement comprising:
at least one of said passageways formed in said nozzle section also being at an acute angle with respect to said axis of said conduit to direct the material and the liquid both tangentially and axially onto said internal surface, said flow path being both circular and axial toward said outlet within said internal surface.

24. In a system according to claim 23, wherein said conduit has a plurality of said apertures spaced axially along said internal surface, the improvement further comprising:
said plurality of nozzle sections admitting the material and the liquid onto said internal surface through each aperture of said plurality of said apertures, said tangential and axial direction of said at least one passageway adjacent to one said aperture that is nearest said outlet directing the incoming material and liquid in a helical path to assist said circular and axial flow within said internal surface.

25. In a system according to claim 21, wherein said conduit has a thin wall section extending along a longitudinal axis of said conduit, said thin wall section defining said internal flow surface; said conduit further comprising:
said conduit having an axially extending thick wall section of greater thickness than said thin wall section and extending outwardly of and along at least a portion of said thin wall section; and
said passageway being formed in said thick wall section.

26. In a system according to claim 21, wherein said conduit is generally tubular and extends along a longitudinal axis, and said at least one aperture defines an axially extending slit, said slit being defined by opposing edges; said conduit further comprising:
an inlet comprising a flow section and a retainer section integral with said retainer section, said retainer section having opposed notches receiving said respective conduit edges to retain said inlet in said slit, said flow section being external to said conduit and having said passageways therein.

27. A system for collecting material from a collector surface in a basin having opposite ends and which is adapted to contain the material and liquid, said system comprising:
a traversing mechanism having a carriage movable from one of said ends of said basin to an opposite one of said ends of said basin,
a pair of conduits mounted side-by-side on said carriage for movement in first and second opposite directions between said ends of said basin,
each of said conduits having a collector section bounded by opposite closed ends and an outlet between said ends, said collector sections having an internal flow surface provided with at least one aperture formed through said internal flow surface between said opposite ends, one of said conduits having said at least one aperture facing said first direction and the other of said conduits having said at least one aperture facing said second direction, each of said conduits also including an outlet between said ends;
each of said conduits being provided with an entrance section having a plurality of bores therein, one of said bores intersecting said at least one aperture when said at least one aperture is one aperture, each of said bores intersecting one of said at least one aperture when said at least one aperture is a plurality of apertures, each said entrance section being external to said internal flow surface and having an opening facing said respective first direction or said second direction, each said bore extending between said respective opening and said respective aperture along an entrance path that is tangential with respect to said internal flow surface;
a driver for said traversing mechanism to move said carriage from one of said ends of said basin to an opposite one of said ends of said basin with said respective conduit opening that faces in the first or second direction of movement collecting the material from said collector surface; and a suction unit connected to said outlet of each of said conduits for applying low pressure to said conduits to urge the material and the liquid to flow into and through said bore in said tangential entrance path and tangentially onto said internal flow surface of said conduit for helical flow to said outlet.

28. A method of collecting material from the bottom of a container, comprising the steps of:

providing a collection conduit with a curved internal material collection surface extending between opposite ends of the conduit, and an outlet for collected material; and causing the material to enter the conduit between the ends and spaced from the outlet and along a plurality of separate paths, each of said paths being tangential to the curved internal material collection surface.

29. The method according to claim 28, further comprising the step of:

said providing step comprising providing the conduit with a longitudinal axis extending between the ends and the curved internal material collection surface in the form of a cylinder extending between the opposite ends of the conduit along the longitudinal axis.

30. The method according to claim 28, further comprising the step of:

said providing step comprising providing the conduit with a longitudinal axis extending between the ends and providing the curved internal material collection surface with three intersecting sides having a triangular cross section perpendicular to the axis and extending between the opposite ends of the conduit along the longitudinal axis; and said path resulting from said causing step being substantially parallel to one of the intersecting sides of the internal material collection surface to render the three sides effective to direct the material in a curved within the conduit.

31. A method of collecting sludge from the bottom of a basin, comprising the steps of:

providing a sludge collection conduit with opposite ends, a sludge outlet between the opposite ends, and a cylindrical internal sludge collection surface extending along a longitudinal axis between the opposite ends of the conduit and intersecting the outlet; and causing the sludge to enter the conduit in paths at a plurality of locations spaced along the conduit between the ends and spaced from the outlet, said paths being both tangential to the curved internal sludge collection surface and at an acute angle with respect to the longitudinal axis and facing the outlet to provide a helical flow of the sludge in the conduit toward the outlet.

32. The method according to claim 31, further comprising:

forming a plurality of apertures in the conduit, one of said apertures being at each of said locations of said paths;

said causing step comprising:

placing an elongated nozzle over each of said apertures, each of said nozzles having a passageway therein for directing the sludge in said path from the basin into said conduit, and reducing the pressure applied to the outlet to cause the sludge to flow from the basin into the passageway of said nozzle and from the passageway in the path tangential to the curved internal sludge collection surface and at the acute angle with respect to the longitudinal axis and facing the outlet to provide said helical flow of the sludge in the conduit toward the outlet.

33. A conduit for collecting material from a collector surface on which the material rests, said conduit having a longitudinal axis and a collector section bounded by opposite closed ends; said collector section having an internal flow surface extending in the direction of the longitudinal axis and said internal flow surface being provided with an elongated aperture formed through said internal flow surface parallel to the longitudinal axis for admitting said material from said collector surface; said conduit comprising:

said conduit being provided with a plurality of passageways located along a line parallel to the longitudinal axis, said passageways intersecting said aperture and being external to said internal flow surface, and said passageways being elongated and tangentially intersecting said internal flow surface via said aperture.

34. A conduit for collecting material from a collector surface on which the material rests, said conduit having a longitudinal axis and a collector section bounded by opposite closed ends; said collector section having an internal flow surface extending in the direction of the longitudinal axis and being provided with a plurality of apertures formed through said internal flow surface and located along a first line parallel to the longitudinal axis for admitting said material from said collector surface; said conduit comprising:

said conduit being provided with a plurality of passageways located along a second line parallel to the longitudinal axis, each of said passageways intersecting a respective one of said plurality of apertures, said passageways being external to said internal flow surface, and said passageways being elongated and tangentially intersecting said internal flow surface via said plurality of apertures.

35. A method of collecting material from the bottom of a container, comprising the steps of:

providing a collection conduit with a curved internal material collection surface extending between opposite ends of the conduit and with a longitudinal axis extending between said ends, and an outlet for collected material; and causing the material to enter the conduit between the ends and spaced from the outlet and along a path that is tangential to the curved internal material collection surface and that has a component in the direction of the longitudinal axis.

36. A method of collecting material from the bottom of a container, comprising the steps of:

providing a collection conduit with a curved internal material collection surface extending between opposite ends of the conduit and with a longitudinal axis extending between said ends, and an outlet for collected material;

causing the material to enter the conduit between the ends and spaced from the outlet and along a path that is tangential to the curved internal material collection surface;

performing said causing step at each of a plurality of locations between one of the ends and the outlet so that one of said paths is closer to the outlet than another of said paths; and performing said causing step with respect to said closer path to also cause said closer path of the material to have a component in the direction of the longitudinal axis and facing toward the outlet.

37. A conduit for collecting material from a collector surface on which the material rests, said conduit having a collector section bounded by opposite closed ends; said collector section having an internal flow surface provided with at least one aperture formed through said internal flow surface between said opposite ends for admitting said material from said collector surface; said internal flow surface being provided with a longitudinal axis extending between said opposite ends, said conduit comprising:

said conduit being provided with a passageway intersecting said at least one aperture and being external to said internal flow surface, said passageway being elongated and tangentially intersecting said internal flow surface via said at least one aperture, and wherein said passageways is also at an acute angle with respect to the longitudinal axis.

* * * * *